US012307586B2

(12) United States Patent
Choi et al.

(10) Patent No.: US 12,307,586 B2
(45) Date of Patent: May 20, 2025

(54) METHOD, APPARATUS, AND COMPUTER-READABLE RECORDING MEDIUM FOR PERFORMING THREE-DIMENSIONAL MODELING FOR MANUFACTURING CONTAINER BY USING TWO-DIMENSIONAL IMAGE IN WEB-BASED ENVIRONMENT

(71) Applicant: MayCoders, INC., Seoul (KR)

(72) Inventors: Saemi Choi, Seoul (KR); Seokjin Hong, Seoul (KR)

(73) Assignee: MayCoders, INC., Seoul (KR)

( * ) Notice: Subject to any disclaimer, the term of this patent is extended or adjusted under 35 U.S.C. 154(b) by 247 days.

(21) Appl. No.: 18/111,095

(22) Filed: Feb. 17, 2023

(65) Prior Publication Data
US 2024/0273816 A1    Aug. 15, 2024

(30) Foreign Application Priority Data

Feb. 13, 2023 (KR) .......................... 10-2023-0018920

(51) Int. Cl.
*G06T 17/00* (2006.01)
*G06T 5/70* (2024.01)
(Continued)

(52) U.S. Cl.
CPC ................ *G06T 17/00* (2013.01); *G06T 5/70* (2024.01); *G06T 7/11* (2017.01); *G06T 7/62* (2017.01);
(Continued)

(58) Field of Classification Search
CPC .. G06T 17/00; G06T 5/70; G06T 7/62; G06T 17/20; G06T 7/11; G06T 7/73;
(Continued)

(56) References Cited

U.S. PATENT DOCUMENTS 7,936,352 B2 * 5/2011 Baran ..................... G06T 17/30
345/646
8,570,343 B2 * 10/2013 Halstead ................. G06T 17/10
345/419
(Continued)

FOREIGN PATENT DOCUMENTS

CN        109559384 A  *  4/2019  ............ G06T 19/20
CN        115035092 A  *  9/2022
(Continued)

*Primary Examiner* — Alicia M Harrington
*Assistant Examiner* — Christine Yera Ahn

(57) ABSTRACT

A method for performing three-dimensional modeling for manufacturing a container by using a two-dimensional image in a web-based environment includes: an image pre-processing step of generating, when a two-dimensional image including an external form image of a container for containing a substance is received from an outside, a standardized first image by pre-processing the received two-dimensional image; a data extraction step of extracting feature data of the container from the first image by applying a standard classification system of the container to the first image; a three-dimensional modeling step of generating a second image by using the feature data and the first image; and a design data generation step of loading a plurality of pre-stored second images into a web-based editing interface that is accessible by a user terminal, and generating container modeling data according to an editing input for the editing interface from the user terminal.

7 Claims, 13 Drawing Sheets

(51) Int. Cl.
*G06T 7/11* (2017.01)
*G06T 7/62* (2017.01)
*G06T 19/20* (2011.01)
*G06V 10/44* (2022.01)
*G06V 10/74* (2022.01)
*G06V 10/764* (2022.01)
*G06V 20/70* (2022.01)

(52) U.S. Cl.
CPC .............. *G06T 19/20* (2013.01); *G06V 10/44* (2022.01); *G06V 10/761* (2022.01); *G06V 10/764* (2022.01); *G06V 20/70* (2022.01); *G06T 2200/08* (2013.01)

(58) Field of Classification Search
CPC ...... G06T 19/20; G06V 10/44; G06V 10/761; G06V 10/764; G06V 20/70; G06F 16/51
See application file for complete search history.

(56) References Cited

U.S. PATENT DOCUMENTS

| | | | | |
|---|---|---|---|---|
| 9,972,140 B1* | 5/2018 | Fulmer | | G06T 17/00 |
| 10,489,970 B2* | 11/2019 | Iverson | | G06T 15/04 |
| 11,481,989 B2* | 10/2022 | Van Bael | | G06T 11/60 |
| 11,710,295 B2* | 7/2023 | Aso | | G06T 19/00 |
| | | | | 345/419 |
| 2013/0218525 A1* | 8/2013 | Gary | | G06F 30/00 |
| | | | | 703/1 |
| 2019/0244340 A1* | 8/2019 | Perron | | G06V 20/52 |
| 2019/0378341 A1* | 12/2019 | Xie | | H04N 21/8146 |
| 2023/0019232 A1* | 1/2023 | Krotoff | | G06T 15/04 |
| 2023/0038240 A1* | 2/2023 | Wiley | | G06T 17/00 |
| 2023/0088925 A1* | 3/2023 | Sharma | | G06F 18/2431 |
| | | | | 382/156 |
| 2023/0196096 A1* | 6/2023 | Milne | | G06N 3/047 |
| | | | | 706/25 |
| 2024/0005593 A1* | 1/2024 | Yu | | G06T 19/20 |
| 2024/0037851 A1* | 2/2024 | Sarshar | | G06T 19/00 |
| 2024/0104902 A1* | 3/2024 | Namiki | | G06V 10/98 |

FOREIGN PATENT DOCUMENTS

| | | | | |
|---|---|---|---|---|
| CN | 116051864 A | * | 5/2023 | |
| EP | 3401875 A2 | * | 11/2018 | ............ B33Y 50/00 |
| EP | 3633624 A1 | * | 4/2020 | ............ G06T 15/04 |

* cited by examiner

METHOD, APPARATUS, AND COMPUTER-READABLE RECORDING MEDIUM FOR PERFORMING THREE-DIMENSIONAL MODELING FOR MANUFACTURING CONTAINER BY USING TWO-DIMENSIONAL IMAGE IN WEB-BASED ENVIRONMENT

BACKGROUND OF THE INVENTION

1. Field of the Invention

The present invention relates to a technology for generating and managing three-dimensional modeling data for manufacturing a three-dimensional product through a two-dimensional image of a container for storing a specific substance, such as a cosmetic container, input by a user or collected online, and more particularly, to a technology capable of generating design data for manufacturing a container by conveniently checking and editing container modeling data online on a web.

2. Description of the Related Art

Cosmetic containers and the like may be manufactured by designing a mold by using design data desired by a customer, and performing injection molding, label printing, and the like base on the designed mold. In this case, a design for a shape and a label of the container may be configured by proposing a shape of a conventional container or a desired container by a designer or a customer company, and generating design data through three-dimensional modeling by a professional design staff.

Recently, as the necessity for various cosmetic containers or other container for accommodating fluids increases for cross boarding, trade, and the like, the needs for designing various containers and manufacturing products are also increasing in customer companies. However, technical issues related to the design of the container may include reduction of a design cost, and easy generation and management of design data that allows manufacture.

As a representative example of such a technology, Korean Patent Registration No. 10-2401120 and the like have disclosed a technology for recognizing design elements in a cosmetic container according to a collected image of the cosmetic container, selecting a design image desired by a customer, determining a design for the selected design image to provide the design to the customer, and determining a design through editing and the like in order to remotely order a customized cosmetic container.

However, such a design may be different from actual modeling for manufacturing a product. In particular, a three-dimensional dataset that allows a cosmetic container to be manufactured while directly checking the cosmetic container with three-dimensional modeling has not been established.

In particular, it may be difficult to handle editing and the like of three-dimensional models. Particularly, since the three-dimensional models may be edited by using a dedicated program or the like, only a technology for checking and editing only design elements, such as the related art, has been disclosed. This is because it is difficult to view and edit the three-dimensional model on a web, and it is impossible to accurately and easily check an image selected by a customer through the three-dimensional modeling.

Recently, as a three. js library, which provides a three-dimensional model view, and the like are developed, a viewer using the three. js library or other web-based viewers for three-dimensional modeling data are emerging. However, the viewers may merely show the three-dimensional model, so that customers may merely check a three-dimensional model that is generated in advance. Accordingly, there is a demand for a technology of processing modeling desired by a customer from an image, and easily processing the modeling into design data that allows a container to be manufactured.

SUMMARY OF THE INVENTION

To solve the problems described above, particularly, an object of the present invention is to provide a technology capable of processing design data for a container such as a cosmetic container through rapid processing and modification even in a web environment by establishing three-dimensional modeling for a cosmetic container patterned by using artificial intelligence from a two-dimensional image input by a customer or collected online, and allowing editing and checking by using data for each container part for the three-dimensional modeling.

To achieve the object described above, according to one embodiment of the present invention, there is provided a method for performing three-dimensional modeling for manufacturing a container by using a two-dimensional image in a web-based environment, the method including: an image pre-processing step of generating, when a two-dimensional image including an external form image of a container for containing a substance is received from an outside, a standardized first image by pre-processing the received two-dimensional image; a data extraction step of extracting feature data of the container from the first image by applying a standard classification system of the container to the first image; a three-dimensional modeling step of generating a second image, which is a basic three-dimensional modeling image of the container, by using the feature data and the first image, and storing the second image in a database; and a design data generation step of loading a plurality of pre-stored second images into a web-based editing interface that is accessible by a user terminal, and generating container modeling data, which is final three-dimensional modeling data according to an editing input for the editing interface from the user terminal.

The image pre-processing step may include: a part standardization step of identifying a container part from the two-dimensional image, and moving the container part to a preset standard position with a preset standard size; a container image extraction step of extracting a container object image from the two-dimensional image corrected by the part standardization step; and a part separation step of separating parts of a lid, a label, and a region other than the label of the container through pixel boundary value and image analysis of the container object image, and generating the first image including an image of the separated parts.

The data extraction step may include: a container classification step of classifying the container into one of a plurality of preset container types by comparing a size relation for each separated part included in the first image generated by the part separation step with a size relation for each part included in a pre-stored container classification system; and a feature extraction step of extracting container type information set for the container by the container classification step and data related to a size and a shape of the separated part as the feature data.

The three-dimensional modeling step may include: a three-dimensional coordinate setting step of converting two-dimensional pixel data of the first image into three-dimensional coordinate data by using pixel data of the first image; a part initial modeling step of generating initial modeling data for each part by applying size and shape data for each part constituting the container part included in the feature data to the initial modeling data constituting the three-dimensional coordinate data obtained by the conversion in the three-dimensional coordinate setting step; and a modeling post-processing step of generating the second image by post-processing the initial modeling data for each part generated by the part initial modeling step.

The modeling post-processing step may include generating the second image, which is lightweight, by simplifying a three-dimensional coordinate for each part of the initial modeling data for each part.

The modeling post-processing step may include labeling and storing a shape for each part included in the initial modeling data for each part as a new shape type for each part when a similarity that is less than a preset threshold similarity is derived for all pre-stored shape types for each part as a result of calculating a similarity between a shape type for each part, which is pre-stored in a container type set as a result of classifying the container by applying a size relation for each part to a size relation for each part included in a pre-stored container classification system, and a shape for each part included in the initial modeling data for each part.

The design data generation step may perform the loading of the second image into the web-based editing interface that is accessible by the user terminal by performing: an initial output step of outputting a plurality of pieces of initial modeling data for each part to the editing interface; and a smoothing step of smoothing a junction region for each part of the initial modeling data for each part.

The design data generation step may include: a part editing step of transforming, when an editing input for one part is received on the editing interface, modeling data of the one part that is subject to the editing input; and an editing reflection step of applying the modeling data of the one part transformed by the part editing step to the smoothing step.

Meanwhile, according to one embodiment of the present invention, there is provided an apparatus for performing three-dimensional modeling for manufacturing a container by using a two-dimensional image in a web-based environment, the apparatus including: an image pre-processing unit for generating, when a two-dimensional image including an external form image of a container for containing a substance is received from an outside, a standardized first image by pre-processing the received two-dimensional image; a data extraction unit for extracting feature data of the container from the first image by applying a standard classification system of the container to the first image; a three-dimensional modeling unit for generating a second image, which is a basic three-dimensional modeling image of the container, by using the feature data and the first image; and a design data generation unit for loading the second image into a web-based editing interface that is accessible by a user terminal, and generating container modeling data, which is final three-dimensional modeling data according to an editing input for the editing interface from the user terminal.

According to the present invention, when a two-dimensional image input by a user or collected from an outside such as online is received, the two-dimensional image may be pre-processed, feature data may be extracted by applying a standard classification system for each container, and basic three-dimensional models for various containers may be generated by using the feature data and the two-dimensional image and stored in a database.

Then, when design data is accessed from a user terminal on a web, a second image, which is basic three-dimensional modeling data, may be loaded into an editing interface on the web, and the design data may be generated according to a part or an overall editing input for the second image.

Accordingly, users can receive standardized data of a cosmetic container or the like from a data set in which data for each part is stored, and generate design data that is customized to a standard to allow manufacture when the design data is generated directly through editing of the standardized data, so that container design data that allows manufacture can be generated through rapid processing and modification on a web environment.

Accordingly, only a three-dimensional initial model of a basic container has to be loaded, so that scripting and rendering can be performed rapidly through a standardized dataset, which enables rapid editing and the like even on the web, and thus the needs of various customers can be met.

DETAILED DESCRIPTION OF THE INVENTION

Hereinafter, various embodiments and/or aspects will be disclosed with reference to the drawings. In the following description, for the purpose of description, numerous specific details are set forth in order to facilitate an overall understanding of one or more aspects. However, it will also be appreciated by a person having ordinary skill in the art to which the present invention pertains that such aspect (s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms "embodiment", "example", "aspect", "illustration", and the like used herein may not be construed as indicating that any aspect or design set forth herein is preferable or advantageous over other aspects or designs.

In addition, it is to be understood that the terms "include" and/or "comprise" indicate the presence of corresponding features and/or elements, but do not preclude the presence or addition of one or more other features, elements, and/or groups thereof.

In addition, although the terms including ordinal numbers such as "first" and "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present invention. The term "and/or" includes any combination of a plurality of described relevant items, or one of the described relevant items.

In addition, unless defined otherwise, all terms used in embodiments of the present invention, including technical and scientific t terms, have the same meaning as those commonly understood by a person having ordinary skill in the art to which the present invention pertains. Any terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

Figure 4:
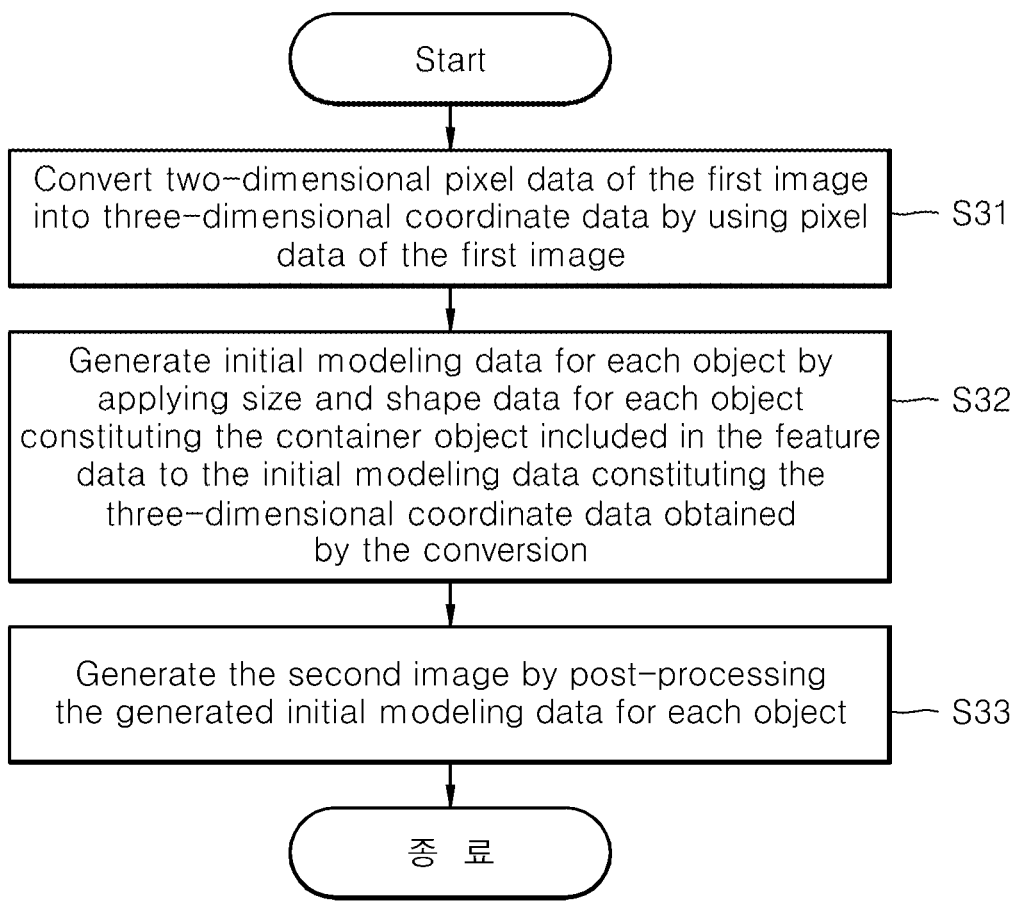
Figure 5:
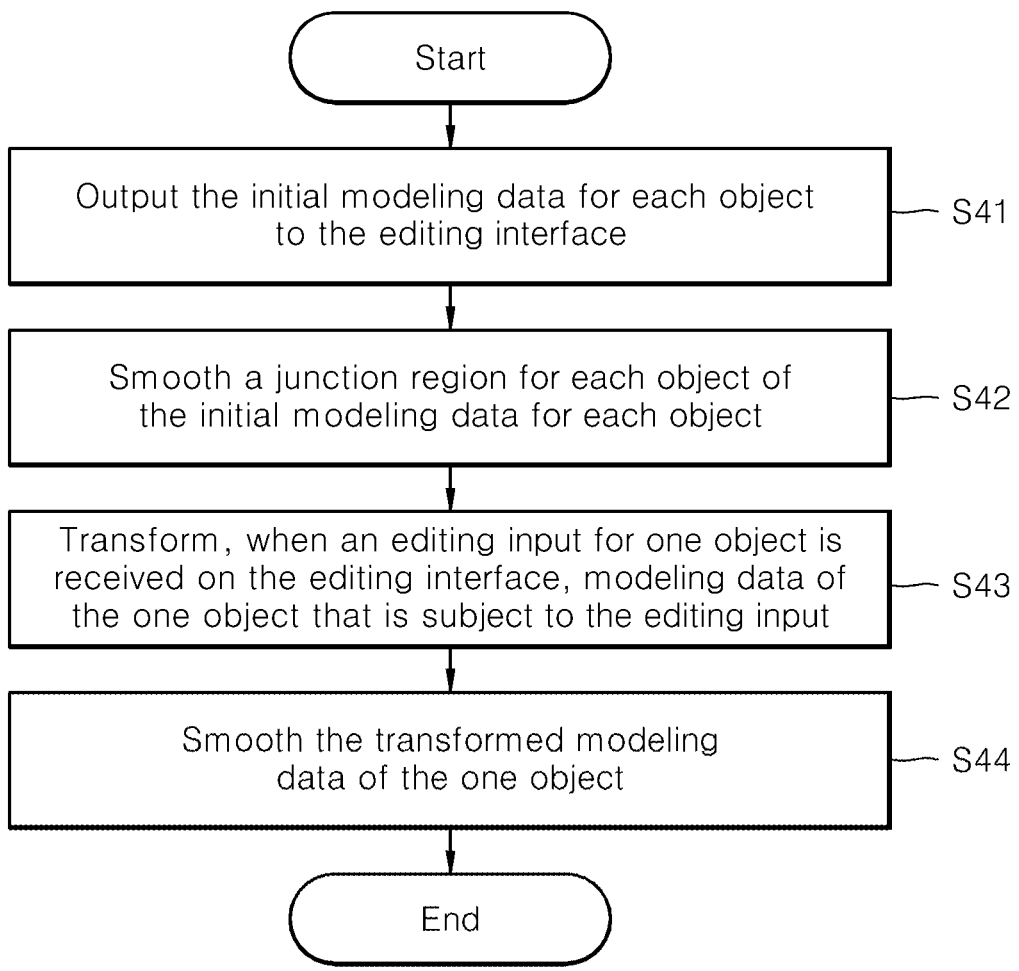
Figure 6:
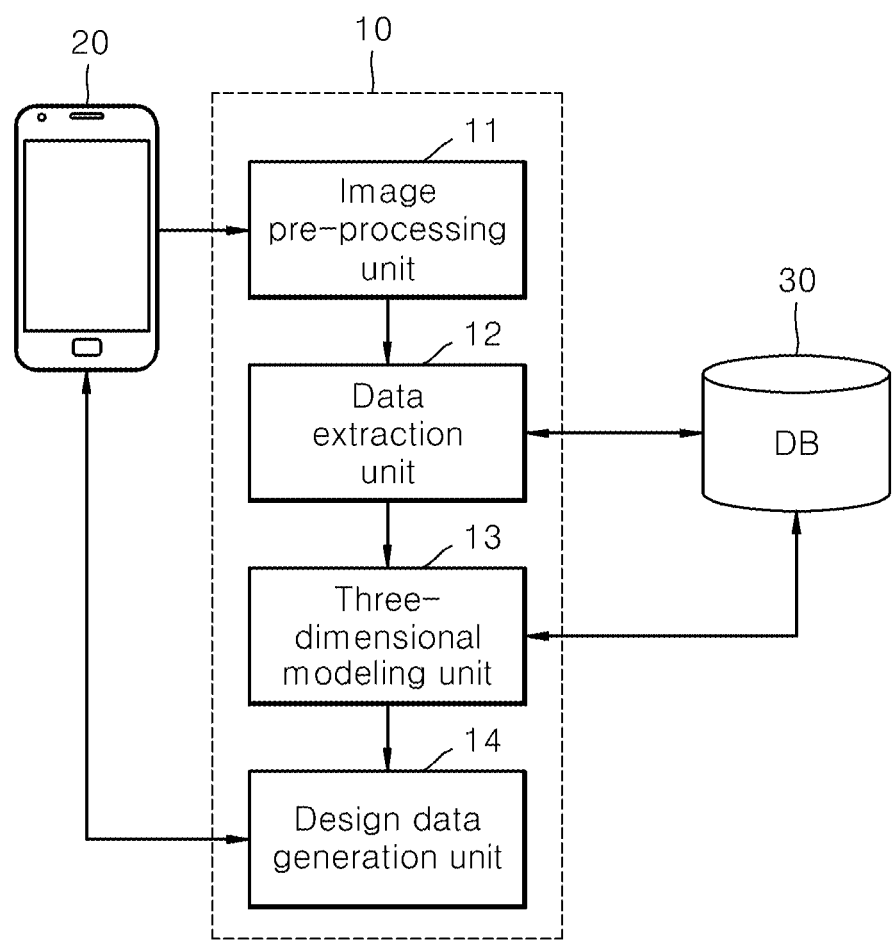
FIG. 6 is a block diagram showing a configuration of an apparatus for performing three-dimensional modeling for manufacturing a container by using a two-dimensional image in a web-based environment according to one embodiment of the present invention.

FIGS. 1 to 5 are flowcharts showing a method for performing three-dimensional modeling for manufacturing a container by using a two-dimensional image in a web-based environment according to one embodiment of the present invention, FIG. 6 is a block diagram showing a configuration of an apparatus for performing three-dimensional modeling for manufacturing a container by using a two-dimensional image in a web-based environment according to one embodiment of the present invention, and FIGS. 7 to 12 show output examples of image data and an editing interface according to execution of functions of the method and the apparatus for performing the three-dimensional modeling for manufacturing the container by using the two-dimensional image in the web-based environment according to one embodiment of the present invention.

Meanwhile, in the following description, although some components shown in the drawings have been omitted or excessively enlarged or reduced in order to describe a function of each of the components of the present invention, it is to be understood that the details shown in the drawings do not limit the technical features and scope of the present invention.

In addition, in the following description, a plurality of drawings may be simultaneously referenced in order to describe one technical feature or one element constituting the invention.

FIGS. 1 to 5 are flowcharts showing a method for performing three-dimensional modeling for manufacturing a container by using a two-dimensional image in a web-based environment according to each embodiment of the present invention. In will be understood that the method for performing the three-dimensional modeling for manufacturing the container by using the two-dimensional image in the web-based environment according to each embodiment of the present invention, which will be described below, is performed by each detailed element of a computing device that will be described below with reference to FIG. 13, or an apparatus 10 for performing three-dimensional modeling for manufacturing a container by using a two-dimensional image in a web-based environment (hereinafter referred to as an "apparatus according to the present invention") according to each embodiment of the present invention as shown in FIG. 6. The apparatus 10 according to the present invention and each detailed element may be elements that are functionally classified as a process of a computing device or software included in a storage space according to execution of functions thereof, in which the elements may be included in one computing device or implemented by groupware in which a plurality of computing devices are combined.

Based on the above description, according to a method for performing three-dimensional modeling for manufacturing a container by using a two-dimensional image in a web-based environment of one embodiment of the present invention, first, the computing device may perform an image pre-processing step S10 of generating, when a two-dimensional image including an external form image of a container for containing a substance is received from an outside, a standardized first image by pre-processing the received two-dimensional image.

According to the present invention, the outside may be a concept that includes all online spaces in which the two-dimensional image is collected for collection and storage of three-dimensional modeling data loaded and used by a user in a step S40 through execution of the step S10 to a step S30 that will be described below and collection schemes. In other words, the outside refers to a storage space that is allowed to be accessed by the apparatus 10 according to the present invention, such as various online websites and clouds in which a two-dimensional image of an external form of a container is stored online. Alternatively, when a container having a desired design is directly found by a user terminal, or an image of the container is generated and provided by the user terminal, the outside may be the user terminal.

According to the present invention, the container for containing the substance refers to, for example, a device having an external form for containing a fluid and supplying the fluid to a purchaser having various additional structures (a pipette, etc.) for conveniently discharging the fluid, such as a cosmetic container. Although a cosmetic container will be described as the container for illustrative purposes in the following description of the embodiment, a device for storing various substances, such as a food container or a medicine container, will be included in the container according to the present invention in addition to the cosmetic container.

The generating of the standardized first image by pre-processing the two-dimensional image refers to a series of processes for preventing a three-dimensional modeling image from being affected by a size and the like when the three-dimensional modeling image is generated, and extracting an accurate image of the container from the two-dimensional image in order to extract standardized image data and feature data by analyzing the two-dimensional image.

For example, when images of other parts and the like are included in the two-dimensional images and the like, the images of other parts and the like may be removed, or when a container part is not located at a center of the two-dimensional image, two-dimensional image may be processed so that only the container part is accurately extracted in a standardized format.

In the step S10, an AI-based part extraction algorithm through pixel boundary value analysis and shape analysis may be used as a scheme of extracting only an external form image of a container from a specific image.

Part detection refers to a computer vision technology for identifying a part on an image or a video. The part detection is a key technology calculated through deep learning and machine learning algorithms. A human may easily recognize people, objects, scenes, and visual details when viewing a photograph or a video. An object of the technology is to train computers to do things that humans can do, such as the ability to understand details included in an image.

The part detection refers to a process of finding an instance of a part in an image. In a case of deep learning, the part detection refers to a subset of part recognition that identifies a part in an image and recognizes a position of the part. Accordingly, a plurality of parts may be identified in one image, and a position of each of the parts may be determined.

According to the present invention, an external form image of a specific type of container may be selected and extracted from various two-dimensional images. For example, according to the present invention, when the container to be extracted from the three-dimensional modeling image is a cosmetic container, a function of identifying an external form image of the cosmetic container from the two-dimensional image collected through part detection for the cosmetic container and detecting a position of the external form image may be performed as a sub-function of the step S10.

When the part is detected through the above process, in the step S10, the computing device may perform an embodiment of processes as shown in FIGS. 2 and 7 to 9 to pre-process the image so that the first image may be generated.

Figure 7:
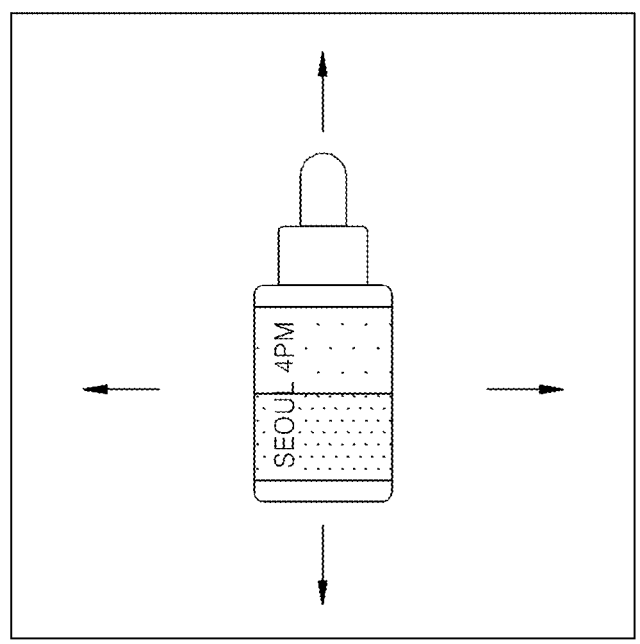
FIGS. 7 to 12 show output examples of image data and an editing interface according to execution of functions of the method and the apparatus for performing the three-dimensional modeling for manufacturing the container by using the two-dimensional image in the web-based environment according to one embodiment of the present invention.
Figure 8:
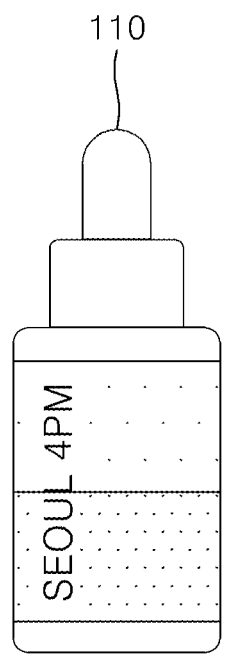

Referring to the drawings described above, first, the computing device may perform a part standardization step S11 of identifying a container part from the two-dimensional image 100, and moving the container part to a preset standard position with a preset standard size. In other words, when a part is detected through the part detection algorithm from the two-dimensional image 100 as shown in FIG. 7, the part may be moved to the center of the image as shown in FIG. 7, a shape of a part corresponding to a lid may be detected to rotate the image so that the lid is directed upward, and a size of the part may be corrected to a standard size (e.g., 220 mm in length or 160 mm in width).

When the step S11 is finished, a container image extraction step S12 of extracting a container object image 110 from the two-dimensional image corrected by the step S11 may be performed. Since the detection of the part has already been performed in the step S10, the container image extraction step S12 refers to a process of correcting the image based on the part as in the step S11, and extracting only the container object image 110 by deleting a background image while leaving only the part detected from the corrected image.

Meanwhile, for a lightweight process that will be performed later on, for example, in the step S12, when the part is extracted, an image size may be reduced by correcting a resolution of the container object image 110 within a preset resolution range (e.g., 200 to 300 dpi).

When the step S12 is performed, the computing device may perform a part separation step S13 of separating parts of a lid, a label, and a region other than the label of the container through pixel boundary value and image analysis of the container object image, and generating the first image including an image of the separated parts.

Figure 9:
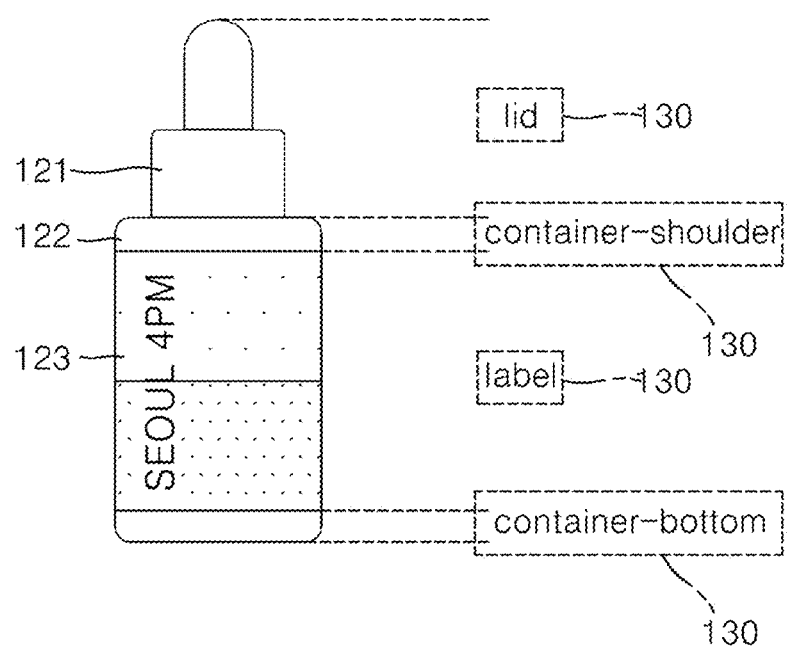

When the container object image is extracted through the step S12, the computing device may separate the container object image 110 into a lid 121, a label 123, and an image 122 other than the label (container-shoulder and container-bottom) as shown in FIG. 9 through the part recognition algorithm, an algorithm for determining a similarity through an AI algorithm through pre-stored standardized three-dimensional modeling data in a database that will be described below or a two-dimensional modeling library for a standardized container shape stored independently of the pre-stored standardized three-dimensional modeling data, a pixel boundary value analysis algorithm, and the like, and may generate an image for each separated part and the first image, which is a container object image in which the parts are combined, by using the separated container object image 110.

Accordingly, in the step S10, an image for each part constituting the container may be separated according to the container object image in a standardized shape and a standardized position, so that data related to a characteristic of each part may be generated, and a three-dimensional modeling image for each part may be generated by using the data.

When the step S10 is finished, the computing device may perform a data extraction step S20 of extracting feature data of the container from the first image by applying a standard classification system of the container to the first image.

According to the present invention, the feature data may be understood as including attribute information for each part denoted by 130 in FIG. 9 and characteristic information of the container corresponding to the first image determined based on the attribute information. In other words, the feature data refers to data for determining a container type corresponding to the first image, which is an image of a container collected to establish a library required for three-dimensional modeling.

Figure 1:
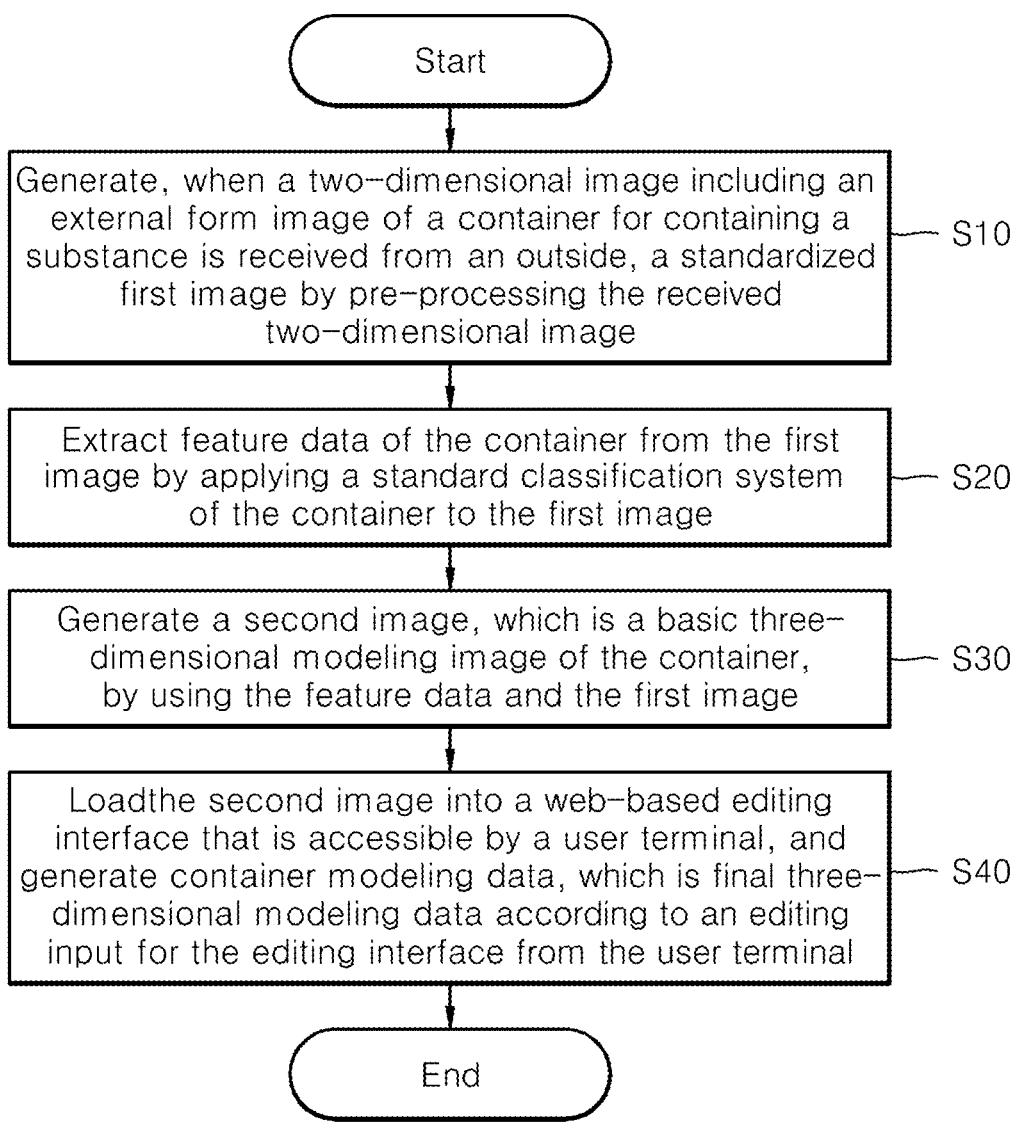
FIGS. 1 to 5 are flowcharts showing a method for performing three-dimensional modeling for manufacturing a container by using a two-dimensional image in a web-based environment according to one embodiment of the present invention.
Figure 2:
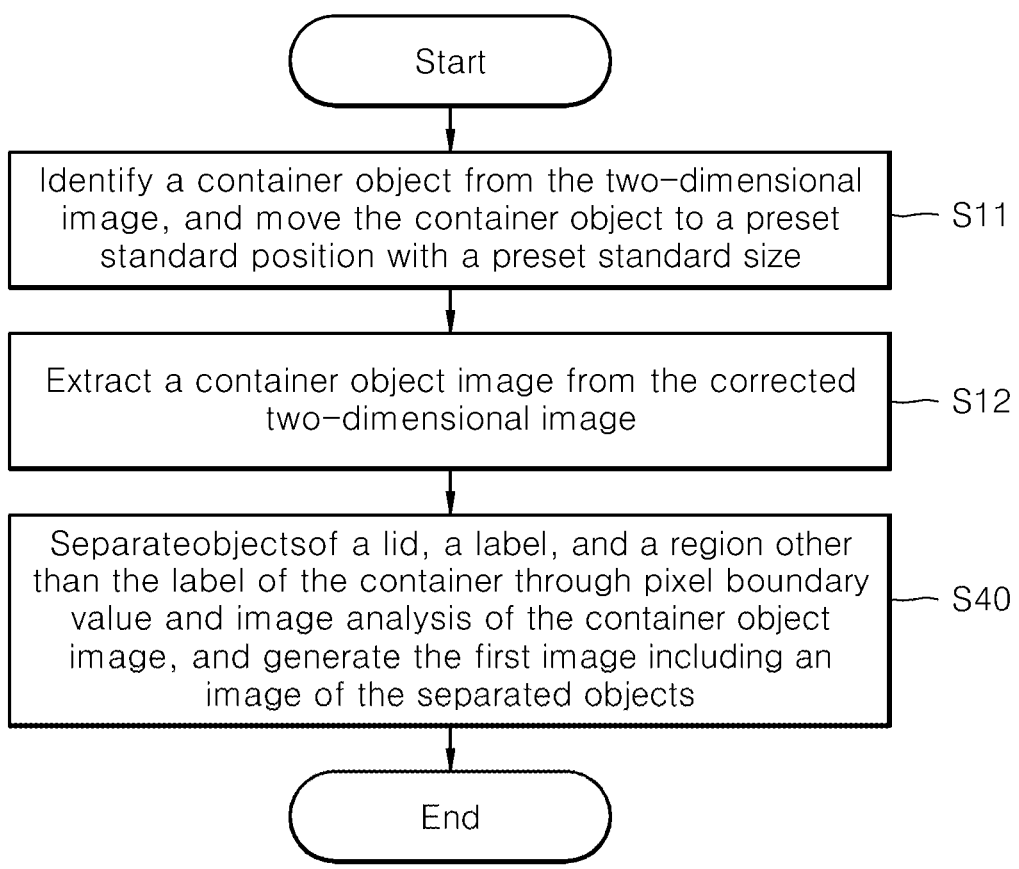
Figure 3:
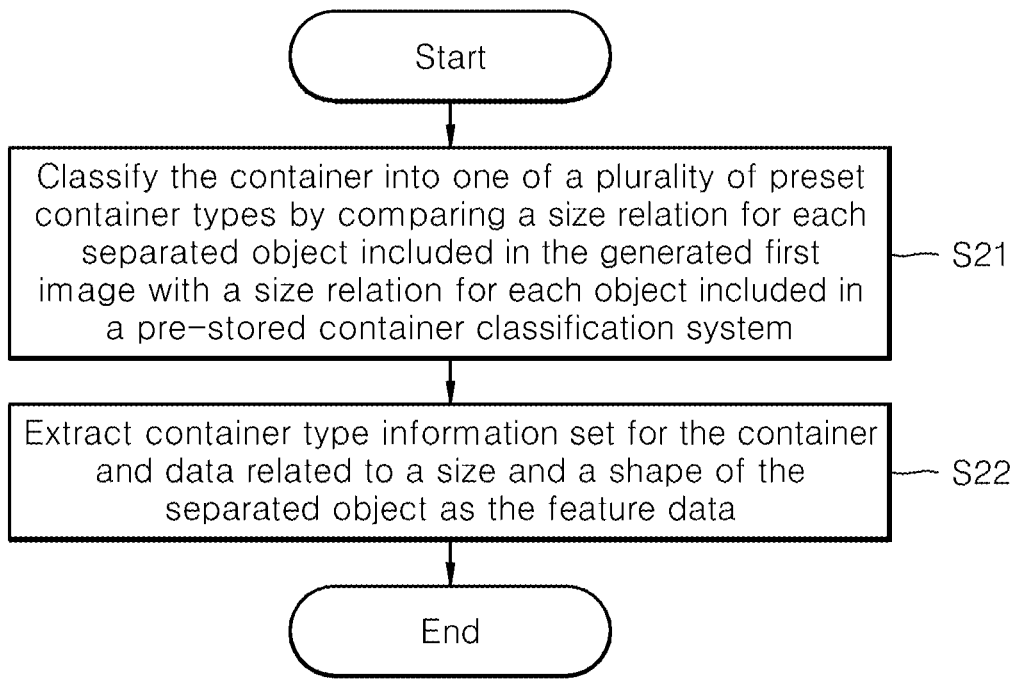

For example, the step S20 may be performed through a specific embodiment shown in FIG. 3. Referring to FIG. 3, first, the computing device may perform a container classification step S21 of classifying the container into one of a plurality of preset container types by comparing a size relation for each separated part included in the first image generated by the part separation step with a size relation for each part included in a pre-stored container classification system.

When the size relation for each part is used, for example, a cosmetic container to which the first image is related among cosmetic containers may be determined. An example thereof is shown in the following table.

TABLE 1

Standard Classification System for Cosmetic Containers

| Category level 1 | Category level 2 |
|---|---|
| Skincare | Skin/Tonor |
|  | Lotion/Emulsion |
|  | Cream |
|  | Serum/Ampoule |
|  | Facial oil/stick/balm |
|  | Eyecare |
|  | Mist |
| Masksheet/pack | Masksheet |
|  | Washoff pack |
|  | Sleeping pack |
|  | Patch |
|  | Nose patch |
| Suncare | Sun cream |
|  | Sun stick/balm |
|  | Sun cushion/powder |
| Cleansing | Cleansing foam |
|  | Cleansing gel/oil/water |
|  | Cleansing balm |
|  | Makeup remover |
| Peeling | Peeling/Exfoliating |
| Body | Body wash |
|  | Body lotion/oil |
|  | Body scrub |

Information on a size relation for each part of each container type may be stored in a storage space of the computing device according to the present invention according to the above category, and when the step S21 is performed, the computing device may classify a container type having the most similar relation as a container type of the container included in the first image by comparing the size relation for each part included in the first image.

Thereafter, the computing device may perform a feature extraction step S22 of extracting container type information set for the container and data related to a size and a shape of the separated part as the feature data. As described above, according to the present invention, the feature data may be stored after being configured by combining the container type information classified through the step S21 and data indicating a shape of each detailed part and a coordinate set or a shape of each pixel with the first image, which is a two-dimensional image for each detailed part.

After such processing, the computing device may generate three-dimensional modeling image data by using the first image and the feature data generated in the steps S10 and S20. In other words, the computing device may perform a three-dimensional modeling step S30 of generating a second image, which is a basic three-dimensional modeling image of the container, by using the feature data and the first image, and storing the second image in a database.

Based on the first image and the feature data as described above, the second image will be understood as a concept including information on a relation and a characteristic between three-dimensional modeling data obtained by three-dimensional modeling of an object for each part and modeling data for each part.

Figure 10:
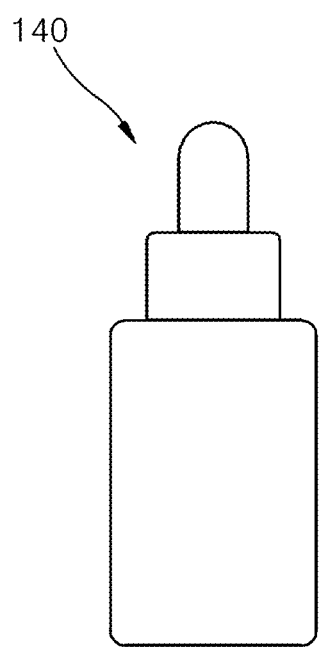
Figure 11:
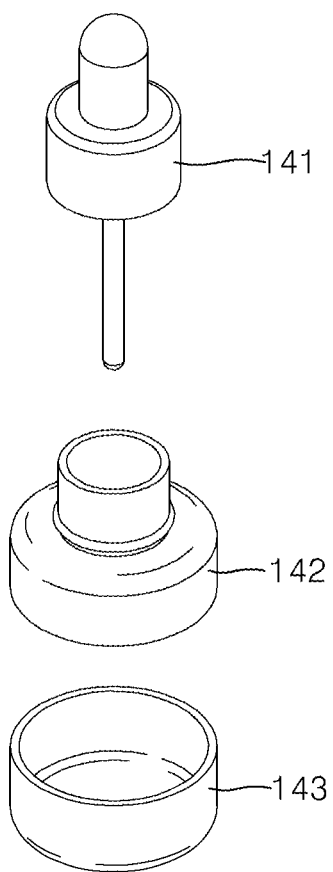

In more detail, the second image may be described as shown in FIGS. 4, 10, and 11. In the description of the step S30, first, the computing device may perform a three-dimensional coordinate setting step S31 of converting two-dimensional pixel data of the first image into three-dimensional coordinate data by using pixel data of the first image.

The step S31 may be performed by using, for example, a three-dimensional coordinate generator using a generative adversarial network (GAN) and an algorithm in which the three-dimensional coordinate generator is customized for a characteristic for each container, that is, the cosmetic container in the description of the present invention.

For example, a three-dimensional GAN may be used, and the 3D-GAN refers to a GAN model for generating a three-dimensional shape. A three-dimensional image processing process may be considerably complicated as compared with a two-dimensional image processing process. Such a complicated problem may be solved by a scheme of generating a three-dimensional image realistically and variously.

The 3D-GAN may be a variation of the GAN, and there are generator and discriminator models. According to the present invention, the generator model may be used among the generator and discriminator models. A main characteristic is that all neural network models use a three-dimensional convolution layer instead of a two-dimensional convolution layer. When enough data is provided, a scheme of generating a three-dimensional shape may be trained.

Three-dimensional convolution (3D convolution) may be used. Unlike conventional two-dimensional convolution, a three-dimensional filter may be applied to three-dimensional input data. Through the convolution, a stacked list in which three-dimensional feature maps are stacked may be generated. An output may be in a form similar to a rectangular parallelepiped shape. An convolution operation may be performed on input data with a kernel (or a filter) having a shape of (3, 3, 3).

Both neural networks constituting 3D-GAN are three-dimensional convolutional neural networks. First, a generator neural network is an upsampling neural network. The neural network may upsample vectors obtained from a probabilistic latent space to generate three-dimensional images having similar lengths, widths, heights, and channels.

Upsampling refers to a process of changing small input data (e.g., 2×2 data) to larger data through convolution.

The generator may include five fully convolutional layers to measure a volume. In addition, the neural network may not include a pooling layer. The fully convolutional layer (fully convolutional network) refers to a layer that is fully connected at an end of a neural network, in which the fully convolutional layer may include only convolutional layers. A 200-dimensional vector extracted from the probabilistic latent space may be used as input data. A three-dimensional image of (64, 64, 64) may be output data. As an activation function, all of the five layers except for a last layer among the five layers may use ReLU, and the last layer may use a sigmoid layer.

In this case, the GAN may be trained through artificial intelligence learning. First, a 200-dimensional latent vector z may be extracted from Gaussian distribution (normal distribution), a fake image G (z) may be generated by using a generator, training may be performed based on a real image and a generated image, the generator may be trained by using an adversarial model, and the above process may be repeatedly performed. In this case, according to the present invention, three-dimensional coordinate data optimized for the cosmetic container may be generated by training the above training process by using sample data for the cosmetic container.

Then, the computing device may perform a part initial modeling step S32 of generating initial modeling data 140 for each part by applying size and shape data for each part constituting the container part included in the feature data to the initial modeling data constituting the three-dimensional coordinate data obtained by the conversion in the three-dimensional coordinate setting step.

When a three-dimensional coordinate is generated as described above, the size and shape data for each part may be applied together with the three-dimensional coordinate, so that initial three-dimensional modeling data 141, 142, and 143 may be generated for each part as shown in FIG. 11.

Thereafter, the computing device may perform a modeling post-processing step S33 of generating the second image by post-processing the generated initial modeling data for each part.

The step S33 may be described as follows. First, in a case of a joint for each part, for example, a coordinate of a lowermost portion of a shoulder may linearly extend so as to meet a coordinate of an uppermost portion of a bottom in the above example of FIG. 9 by using a relation of a part for each class.

In addition, a lightweight second image may be generated by simplifying a three-dimensional coordinate for each part of the initial modeling data for each part by using a characteristic of the container for the initial modeling data for each part. Since, for example, a cosmetic container has a symmetrical structure, a coordinate may be simplified by dividing a portion of a specific part, and performing symmetric processing or fixing a width.

When the second image is generated through the above process, for example, as described above, a plurality of second images to be edited may be stored in the database in a step S40 that will be described below, and may be loaded and edited later on by the user terminal, so that design data for manufacturing a container desired by a user may be generated.

In this case, in the step S40, the second image may be stored in the database as a library so as to serve as a classification criterion for users to select the second image. In this case, a container pattern to which the second image belongs may be managed as metadata, in which the second image generated through execution of the steps S10 to S30 may not belong to any pattern.

In order to handle such a case, while performing the step S33, the computing device may perform labeling and storing a shape for each part included in the initial modeling data for each part as a new shape type for each part when a similarity that is less than a preset threshold similarity (e.g., 10%) is derived for all pre-stored shape types for each part as a result of calculating a similarity between a shape type for each part, which is pre-stored in a container type set as a result of classifying the container by applying a size relation for each part to a size relation for each part included in a pre-stored container classification system, and a shape for each part included in the initial modeling data for each part, so that a second image having a new shape may also be classified and stored.

When the steps S10 to S30 are performed as described above, the two-dimensional image of the container received from the outside may be configured as a library so as to be managed as the three-dimensional modeling data. Thereafter, the computing device may perform a design data generation step S40 to allow users to generate design data in a web environment.

The step S40 may be a process of loading a plurality of pre-stored second images into a web-based editing interface that is accessible by a user terminal, and generating container modeling data, which is final three-dimensional modeling data according to an editing input for the editing interface from the user terminal.

Figure 12:
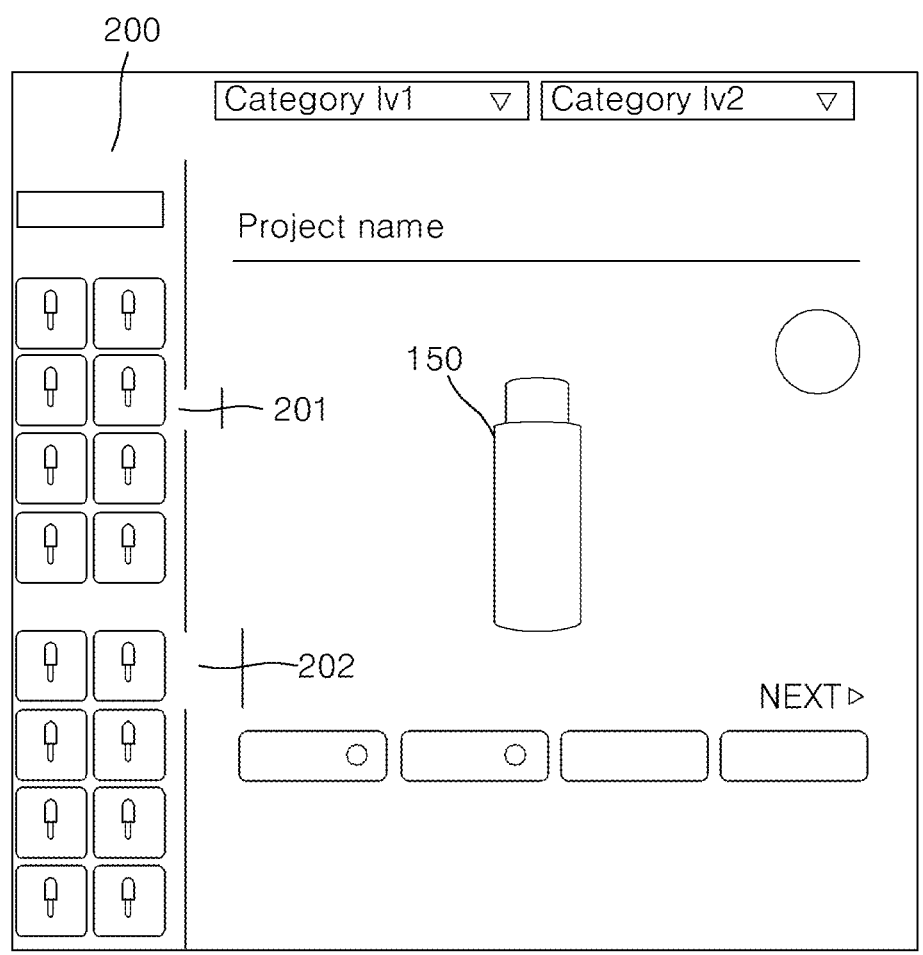

First, when the second image is loaded into the editing interface as shown in FIG. 12, smooth modeling data may be output to the users, so that the design data according to modeling of a shape of each part selected by the user may be checked through a complete modeling shape of a container product from the beginning.

For example, while performing the step S40, shown in FIGS. 5 and 12, the computing device may perform the loading of the second image 150 into the web-based editing interface 200 that is accessible by the user terminal by performing: an initial output step S41 of outputting a plurality of pieces of initial modeling data for each part to the editing interface; and a smoothing step S42 of smoothing a junction region for each part of the initial modeling data for each part.

According to the steps S41 and S42, when the users receive a selection input for the initial modeling data of the editing interface 200, the three-dimensional modeling data corresponding to the second image may be loaded for each part. In this case, a boundary portion of the modeling data for each part, that is, a junction portion according to each part may be smoothed through the step S42, so that design data for the container in a completely completed state may be checked in real time from the initial loading.

The smoothing refers to a processing scheme of designating a predetermined portion of a continuous object and allowing the predetermined portion to appear as continuous modeling through smooth processing. Basically, when a smoothing group for each object is designated in three-dimensional modeling software or the like, a boundary surface of an object in the designated group may be unified and smoothed. According to the present invention, the above process may be implemented remotely so that smoothed modeling data may be output on the web.

When very lightweight data is directly smoothed and output as described above by the modeling post-processing step S33, the following effects may be obtained. Basically, in order to implement a modified three-dimensional model on the web according to the related art, mutually different three-dimensional models have to be loaded, so that a loading time may be very long. However, according to an improved scheme of the present invention, initial three-dimensional modeling data of a basic container may be loaded, which enables very rapid loading, and scripting and rendering may be performed on the initial three-dimensional modeling data, which enables very rapid editing and loading.

For example, a waiting time required for the loading may be reduced to $\frac{1}{10}$ or less as compared with a conventional scheme. In particular, the editing of the three-dimensional model may be easily implemented even on the web through the lightweight data as described above.

When the second image 150 is loaded on the editing interface 200 as described above, the computing device may perform: a part editing step S43 of transforming, when an editing input for one part is received through menus 201 and 202 on the editing interface, modeling data of the one part that is subject to the editing input; and an editing reflection step S44 of applying the modeling data of the one part transformed by the step S43 to the smoothing step. Accordingly, when a completion input for the editing is received after checking the design data that is edited in real time, as described above, the container modeling data, which is the final three-dimensional modeling data, may be generated and provided to the user terminal.

As shown in FIG. 12, the menus 201 and 202 refer to menus capable of editing a detailed size for each part, a size, a shape, a labeling phrase, and the like. When the modeling is edited for each part through the menus 201 and 202, the step S44 may be performed so that the user may check the container modeling data completed while being edited as a state after execution of the step S42 again through the editing interface 200 in real time.

According to the present invention, when a two-dimensional image input by a user or collected from an outside such as online is received, the two-dimensional image may be pre-processed, feature data may be extracted by applying a standard classification system for each container, and basic three-dimensional models for various containers may be generated by using the feature data and the two-dimensional image and stored in a database.

Then, when design data is accessed from a user terminal on a web, a second image, which is basic three-dimensional modeling data, may be loaded into an editing interface on the web, and the design data may be generated according to a part or an overall editing input for the second image.

Accordingly, users may receive standardized data of a cosmetic container or the like from a data set in which data for each part is stored, and generate design data that is customized to a standard to allow manufacture when the design data is generated directly through editing of the standardized data, so that container design data that allows manufacture may be generated through rapid processing and modification on a web environment.

Accordingly, only a three-dimensional initial model of a basic container has to be loaded, so that scripting and rendering may be performed rapidly through a standardized dataset, which enables rapid editing and the like even on the web, and thus the needs of various customers may be met.

Meanwhile, FIG. 6 is a diagram showing a configuration of the apparatus 10 according to the present invention described above. In the following description, redundant descriptions of portions corresponding to the above descriptions will be omitted. Referring to FIG. 6, the apparatus 10 according to the present invention may include an image pre-processing unit 11, a data extraction unit 12, a three-dimensional modeling unit 13, and a design data generation unit 14, and a database 30 for storing all stored data such as a library for the second image may be included in or connected to the apparatus 10 according to the present invention.

The image pre-processing unit 11 may perform a function of generating, when a two-dimensional image including an external form image of a container for containing a substance is received from an outside 20, a standardized first image by pre-processing the received two-dimensional image. In other words, the image pre-processing unit 11 may be a component that performs all the functions set forth in the steps S10, S11, S12, and 13 in the above description.

The data extraction unit 12 may perform a function of extracting feature data of the container from the first image by applying a standard classification system of the container to the first image. In other words, the data extraction unit 12 may be a component that performs all the functions set forth in the steps S20, S21, and S22 in the above description.

The three-dimensional modeling unit 13 may perform a function of generating a second image, which is a basic three-dimensional modeling image of a container, by using the feature data and the first image, and storing the second image in a database 30. In other words, the three-dimensional modeling unit 13 may be a component that performs all the functions set forth in the steps S30, S31, S32, and S33 in the above description.

The design data generation unit 14 may perform a function of loading the second image into a web-based editing interface that is accessible by a user terminal 20, and generating container modeling data, which is final three-dimensional modeling data according to an editing input for the editing interface from the user terminal 20. In other words, design data generation unit 14 may be a component that performs all the functions set forth in the steps S40, S41, S42, S43, and S44 in the above description.

Figure 13:
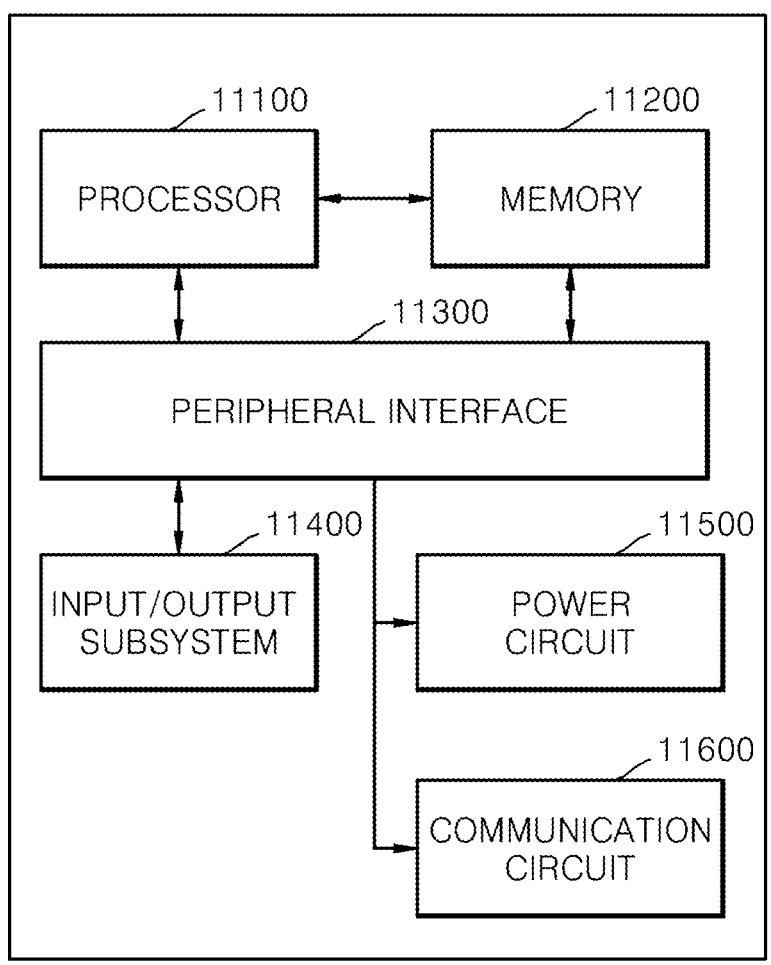
FIG. 13 shows one example of an internal configuration of a computing device according to one embodiment of the present invention.

FIG. 13 shows one example of an internal configuration of a computing device according to one embodiment of the present invention. In the following description, redundant descriptions of the embodiment corresponding to the above descriptions for FIGS. 1 to 12 will be omitted.

As shown in FIG. 13, a computing device 10000 may at least include at least one processor 11100, a memory 11200, a peripheral interface 11300, an input/output (I/O) subsystem 11400, a power circuit 11500, and a communication circuit 11600. In this case, the computing device 10000 may correspond to a user terminal A connected to a tactile interface device, or correspond to a computing device B described above.

The memory 11200 may include, for example, a high-speed random access memory, a magnetic disk, an SRAM, a DRAM, a ROM, a flash memory, or a non-volatile memory. The memory 11200 may include a software module, an instruction set, or other various data required for an operation of the computing device 10000.

In this case, access to the memory 11200 from other components of the processor 11100, the peripheral interface 11300, or the like may be controlled by the processor 11100.

The peripheral interface 11300 may couple an input and/or output peripheral device of the computing device 10000 to the processor 11100 and the memory 11200. The processor 11100 may execute the software module or the instruction set stored in the memory 11200 to perform various functions for the computing device 10000 and process data.

The I/O subsystem 11400 may couple various input/output peripheral devices to the peripheral interface 11300. For example, the I/O subsystem 11400 may include a controller for coupling the peripheral device, such as a monitor, a keyboard, a mouse, a printer, or a touch screen or a sensor if necessary, to the peripheral interface 11300. According to another aspect, input/output peripheral devices may be coupled to the peripheral interface 11300 without passing through the I/O subsystem 11400.

The power circuit 11500 may supply a power to all or some of the components of the terminal. For example, the power circuit 11500 may include a power management system, at least one power source such as a battery or an alternating current (AC), a charging system, a power failure detection circuit, a power converter or inverter, a power status indicator, or any other components for generating, managing, or distributing a power.

The communication circuit 11600 may use at least one external port to enable communication with other computing devices.

Alternatively, as described above, the communication circuit 11600 may include an RF circuit, if necessary, to transmit and receive an RF signal, also known as an electromagnetic signal, thereby enabling the communication with other computing devices.

The above embodiment of FIG. 13 is merely one example of the computing device 10000, and the computing device 10000 may have a configuration or arrangement that omits some of the components shown in FIG. 13, further includes an additional component that is not shown in FIG. 13, or combines at least computing two components. For example, a device for a communication terminal in a mobile environment may further include a touch screen, a sensor, and the like in addition to the components shown in FIG. 13, and the communication circuit 11600 may include a circuit for RF communication in various communication schemes (Wi-Fi, 3G, LTE, Bluetooth, NFC, Zigbee, etc.). The components that may be included in the computing device 10000 may be implemented as hardware, software, or a combination of both hardware and software including at least one integrated circuit specialized in signal processing or an application.

The methods according to the embodiment of the present invention may be implemented in the form of program instructions that may be executed through various computing devices, and may be recorded in a computer-readable medium. In particular, a program according to the present embodiment may be configured as a PC-based program or an application dedicated to a mobile terminal. An application to which the present invention is applied may be installed in a user terminal through a file provided by a file distribution system. For example, the file distribution system may include a file transmission unit (not shown) for transmitting the file according to a request from the user terminal.

The device described above may be implemented as a hardware component, a software component, and/or a combination of the hardware component and the software component. For example, the devices and components described in the embodiments may be implemented by using at least one general-purpose or special-purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. A processing device may execute an operating system (OS) and at least one software application executed on the operating system. In addition, the processing device may access, store, manipulate, process, and generate data in response to the execution of the software. In some cases, one processing device has been described as being used for convenience of understanding. However, it will be appreciated by those skilled in the art that the processing device may include a plurality of processing elements and/or a plurality of types of processing elements. For example, the processing device may include a plurality of processors or one processor, other processing and one controller. In addition, processor may also be configurations such as a parallel possible.

The software may include a computer program, a code, an instruction, or a combination of at least one thereof, and may configure the processing device to operate as desired or instruct the processing device independently or collectively. In order for the software and/or data to be interpreted by the processing device or to provide an instruction or data to the processing device, the software and/or data may be permanently or temporarily embodied in any type of machine, component, physical device, virtual equipment, computer storage medium, or device. The software may be distributed over computing devices, which are connected through a network, so as to be stored or executed in a distributed manner. The software and data may be stored in at least one computer-readable recording medium.

The method according to the embodiment may be implemented in the form of a program instruction that may be executed through various computer mechanisms, and may be recorded in a computer-readable medium. The computer-readable medium may include a program instruction, a data file, a data structure, and the like, alone or in combination with each other. The program instruction recorded in the medium may be specially designed and configured for the embodiment, or may be publicly known and available to those skilled in the art of computer software. An example of the computer-readable recording medium includes magnetic media such as a hard disk, a floppy disk, and a magnetic tape, optical media such as a CD-ROM and a DVD, magneto-optical media such as a floptical disk, and a hardware device specially configured to store and execute a program instruction, such as a ROM, a RAM, and a flash memory. An example of the program instruction includes a high-level language code that may be executed by a computer by using an interpreter or the like, as well as a machine language code generated by a compiler. The hardware device may be configured to operate as at least one software module to perform the operations of the embodiments, and vice versa.

Although the above description has been made with reference to specific embodiments and drawings, various modifications and changes can be made by those skilled in the art from the above description. For example, even when the described techniques are performed in an order that is different from the described manner, and/or the described components such as systems, structures, devices, and circuits are coupled or combined in a form that is different from the described manner, or replaced or substituted by other components or equivalents, appropriate results may be achieved. Therefore, other implementations, other embodiments, and equivalents to the claims are also within the scope of the appended claims.

What is claimed is:

1. A method for performing three-dimensional modeling for manufacturing a container by using a two-dimensional image in a web-based environment, which is implemented by a computing device including at least one processor and at least one memory for storing instructions that are executable by the processor, the method comprising:
    an image pre-processing step of generating, when a two-dimensional image including an external form image of a container for containing a substance is received from an outside, a standardized first image by pre-processing the received two-dimensional image;
    a data extraction step of extracting feature data of the container from the standardized first image by applying a standard classification system of the container to the standardized first image;
    a three-dimensional modeling step of generating a second image, which is a basic three-dimensional modeling image of the container, by using the feature data and the standardized first image, and storing the second image in a database, wherein said three-dimensional modeling step includes:
    a three-dimensional coordinate setting step of converting two-dimensional pixel data of the standardized first image into three-dimensional coordinate data by using pixel data of the standardized first image;
    a part initial modeling step of generating initial modeling data for each part by applying size and shape data for each part constituting a container part included in the feature data to initial modeling data constituting the three-dimensional coordinate data; and
    a modeling post-processing step of generating the second image by post-processing the initial modeling data for each part generated; and
    a design data generation step of loading a plurality of pre-stored second images into a web-based editing interface that is accessible by a user terminal, and generating container modeling data, which is final three-dimensional modeling data according to an editing input for the web-based editing interface from the user terminal,
    wherein said design data generation step includes:
    an initial output step of outputting the initial modeling data for each part to the web- based editing interface;
    a smoothing step of smoothing a junction region for each part of the initial modeling data for each part;
    a part editing step of transforming, when an editing input for one part is received on the web-based editing interface, initial modeling data of the one part that is subject to the editing input; and
    an editing reflection step of applying the initial modeling data of the one part transformed by the part editing step to the smoothing step.

2. The method of claim 1, wherein the image pre-processing step includes:
    a part standardization step of identifying a container part from the two-dimensional image, and moving the container part to a preset standard position with a preset standard size;
    a container image extraction step of extracting a container object image from the two-dimensional image corrected by the part standardization step; and a part separation step of separating parts of a lid, a label, and a region other than the label of the container through pixel boundary value and image analysis of the container object image, and generating the standardized first image including an image of the separated parts.

3. The method of claim 2, wherein the data extraction step includes:
   a container classification step of classifying the container into one of a plurality of preset container types by comparing a size relation for each separated part included in the standardized first image generated by the part separation step with a size relation for each part included in a pre-stored container classification system; and
   a feature extraction step of extracting container type information set for the container by the container classification step and data related to a size and a shape of the separated part as the feature data.

4. The method of claim 1, wherein the modeling post-processing step includes generating the second image, which is lightweight, by simplifying a three-dimensional coordinate for each part of the initial modeling data for each part.

5. The method of claim 1, wherein the modeling post-processing step includes labeling and storing a shape for each part included in the initial modeling data for each part as a new shape type for each part when a similarity that is less than a preset threshold similarity is derived for all pre-stored shape types for each part as a result of calculating a similarity between a shape type for each part, which is pre-stored in a container type set as a result of classifying the container by applying a size relation for each part to a size relation for each part included in a pre-stored container classification system, and a shape for each part included in the initial modeling data for each part.

6. An apparatus for performing three-dimensional modeling for manufacturing a container by using a two-dimensional image in a web-based environment, which is implemented by a computing device including at least one processor and at least one memory for storing instructions that are executable by the processor, the apparatus comprising:
   an image pre-processing unit for generating, when a two-dimensional image including an external form image of a container for containing a substance is received from an outside, a standardized first image by pre-processing the received two-dimensional image;
   a data extraction unit for extracting feature data of the container from the standardized first image by applying a standard classification system of the container to the standardized first image;
   a three-dimensional modeling unit for generating a second image, which is a basic three- dimensional modeling image of the container, by using the feature data and the standardized first image, wherein said three-dimensional modeling unit is configured to perform:
   a three-dimensional coordinate setting step of converting two-dimensional pixel data of the standardized first image into three-dimensional coordinate data by using pixel data of the standardized first image;
   a part initial modeling step of generating initial modeling data for each part by applying size and shape data for each part constituting a container part included in the feature data to initial modeling data constituting the three-dimensional coordinate data; and
   a modeling post-processing step of generating the second image by post-processing the initial modeling data for each part generated; and a design data generation unit for loading the second image into a web-based editing interface that is accessible by a user terminal, and generating container modeling data, which is final three-dimensional modeling data according to an editing input for the web-based editing interface from the user terminal,
wherein said design data generation unit is configured to perform:
   an initial output step of outputting the initial modeling data for each part to the web-based editing interface;
   a smoothing step of smoothing a junction region for each part of the initial modeling data for each part;
   a part editing step of transforming, when an editing input for one part is received on the web-based editing interface, initial modeling data of the one part that is subject to the editing input; and
   an editing reflection step of applying the initial modeling data of the one part transformed by the part editing step to the smoothing step.

7. A non-transitory computer-readable recording medium, wherein the computer-readable recording medium stores instructions for allowing a computing device to perform:
   an image pre-processing step of generating, when a two-dimensional image including an external form image of a container for containing a substance is received from an outside, a standardized first image by pre-processing the received two-dimensional image;
   a data extraction step of extracting feature data of the container from the standardized first image by applying a standard classification system of the container to the standardized first image;
   a three-dimensional modeling step of generating a second image, which is a basic three-dimensional modeling image of the container, by using the feature data and the standardized first image, and storing the second image in a database, wherein said three-dimensional modeling step includes:
   a three-dimensional coordinate setting step of converting two-dimensional pixel data of the standardized first image into three-dimensional coordinate data by using pixel data of the standardized first image;
   a part initial modeling step of generating initial modeling data for each part by applying size and shape data for each part constituting a container part included in the feature data to initial modeling data constituting the three-dimensional coordinate data; and
   a modeling post-processing step of generating the second image by post-processing the initial modeling data for each part generated; and
   a design data generation step of loading a plurality of pre-stored second images into a web-based editing interface that is accessible by a user terminal, and generating container modeling data, which is final three-dimensional modeling data according to an editing input for the web-based editing interface from the user terminal,
wherein the design data generation step includes:
   an initial output step of outputting the initial modeling data for each part to the web-based editing interface;
   a smoothing step of smoothing a junction region for each part of the initial modeling data for each part;
   a part editing step of transforming, when an editing input for one part is received on the web-based editing interface, initial modeling data of the one part that is subject to the editing input; and an editing reflection step of applying the initial modeling data of the one part transformed by the part editing step to the smoothing step.

\* \* \* \* \*